(12) United States Patent
Gerpheide et al.

(10) Patent No.: US 7,400,318 B2
(45) Date of Patent: Jul. 15, 2008

(54) TOUCHPAD HAVING INCREASED NOISE REJECTION, DECREASED MOISTURE SENSITIVITY, AND IMPROVED TRACKING

(75) Inventors: George Gerpheide, Salt Lake City, UT (US); Brian Taylor, Sandy, UT (US); Daniel Lee, Salt Lake City, UT (US)

(73) Assignee: Cirque Corporation, Salt Utah City, UT (US)

( * ) Notice: Subject to any disclaimer, the term of this patent is extended or adjusted under 35 U.S.C. 154(b) by 877 days.

(21) Appl. No.: 10/756,807

(22) Filed: Jan. 12, 2004

(65) Prior Publication Data
US 2004/0188151 A1   Sep. 30, 2004

Related U.S. Application Data

(62) Division of application No. 09/603,417, filed on Jun. 22, 2000, now Pat. No. 6,730,863.

(51) Int. Cl.
*G06F 3/041* (2006.01)
*G06F 3/044* (2006.01)

(52) U.S. Cl. ............... 345/173; 345/157; 178/18.01; 178/18.06

(58) Field of Classification Search ......... 345/156–184; 178/18.01–18.11, 20.01–20.04
See application file for complete search history.

(56) References Cited

U.S. PATENT DOCUMENTS

| 4,550,221 | A |  | 10/1985 | Mabusth |
| 5,374,787 | A |  | 12/1994 | Miller et al. |
| 5,495,077 | A |  | 2/1996 | Miller et al. |
| 5,543,590 | A |  | 8/1996 | Gillespie et al. |
| 5,543,591 | A |  | 8/1996 | Gillespie et al. |
| 5,880,411 | A |  | 3/1999 | Gillespie et al. |
| 5,880,717 | A | * | 3/1999 | Chan et al. ............. 345/173 |
| 5,914,465 | A |  | 6/1999 | Allen et al. |
| 5,943,052 | A |  | 8/1999 | Allen et al. |
| 6,028,271 | A |  | 2/2000 | Gillespie et al. |
| 6,323,846 | B1 | * | 11/2001 | Westerman et al. ......... 345/173 |
| 6,380,931 | B1 |  | 4/2002 | Gillespie et al. |
| 6,414,671 | B1 |  | 7/2002 | Gillespie et al. |

* cited by examiner

*Primary Examiner*—David L Lewis
(74) *Attorney, Agent, or Firm*—Morriss O'Bryant Compagni

(57) ABSTRACT

An improved touchpad and measurement circuitry for enabling input to a computer or other electronic device. The system includes an X electrode, a Y electrode, a common sensing electrode, and a "water" electrode, wherein these four separate electrodes can be implemented in various physical configurations to obtain the desired effects, wherein moisture and water droplets can be identified and compensated for so as not to interfere with the input of data, wherein noise rejection is achieved by using a time aperture filtering method, wherein an improved scanning technique focuses scanning around an identified input object, wherein an adaptive motion filter responds to the speed and acceleration of an object being tracked, and wherein the measurement circuitry has an increased dynamic range enabling the touchpad to operate with greater tolerances to manufacturing variances.

20 Claims, 3 Drawing Sheets

TOUCHPAD HAVING INCREASED NOISE REJECTION, DECREASED MOISTURE SENSITIVITY, AND IMPROVED TRACKING

This application claims priority to application Ser. No. 09/603,417 filed Jun. 22, 2000 now U.S. Pat. No. 6,730,863, and is a divisional application thereof.

BACKGROUND

1. The Field of the Invention

This invention relates generally to touchpad technology. Specifically, the invention is an improved system and apparatus for utilizing a touchpad which is primarily used for cursor control on a computer display. The advantages of the invention relate generally to improved noise rejection, immunity to the effects of moisture on the touchpad surface, increased manufacturing tolerances, an improved scanning pattern, and an adaptive motion filter.

2. The State of the Art

The state of the art in capacitance sensitive touchpad technology spans a variety of different technologies and methodologies for sensing the location and movement of a pointing object as it moves across a touchpad surface. The means by which data can be input to a computer or other electronic apparatus are many. For example, one method of providing input is through manipulation of a cursor on a computer display. By controlling a cursor, the cursor can be caused to move icons or other objects on the display, such as text, or select buttons, hyperlinks or icons. In addition, discrete tappings on the touchpad surface can be caused to actuate buttons or controls that are disposed beneath the cursor on the computer display. Another method of data input includes using gestures that can be recognized by programming routines disposed in the software or firmware of the touchpad.

However, regardless of whether the touchpad is being used for cursor control or any of the other methods of data input, touchpads are being called upon to be more versatile, and to operate more reliably, especially in adverse operating conditions and environments.

The demands of data input reliability are especially becoming more critical. Touchpads are not only being used in many portable computers, but also in personal information managers (PIMs) and personal digital assistants (PDAs). The desire to be mobile and at the same time connected to communications services has consequently created the need for novel forms of data input. But new applications for the use of touchpads have brought more challenges for reliable performance. These challenges not only come from the devices in which they are used, but the environments in which they operate as well.

For example, moisture on a touchpad surface has always been a hindrance to reliable touchpad operation. But touchpads are not only being used in very humid climates, but also in inclement weather, where water droplets might splash onto the touchpad surface. State of the art touchpads perform poorly in these situations, again posing challenges to reliable touchpad performance.

Weather and climate are not the only formidable problems for touchpads. For example, the electronic environment poses its own kind of challenges. Consider a portable computer that is operating on its own internal battery power supply. The user might want to save battery power by plugging into an AC outlet. The electronic noise generated by an AC power source is very large, and can significantly impact the performance of a touchpad.

Another problem in the state of the art is inevitable when the touchpad is being used in a portable device. Power consumption will always be an issue when operating away from an AC or large DC power source. However, touchpad circuitry has generally not been considered an area where power usage can be minimized. Nevertheless, it has been determined by the inventors that significant improvements in power conservation can be obtained.

Accordingly, what is needed is an improved touchpad that is able to compensate for general electromagnetic noise (EMI) interference, as well as the more specific problems of noise from an AC power source. It would also be an improvement to have increased immunity to the problems created for a touchpad when exposed to moisture and water droplets.

Along with the noise and moisture problems identified above, there are other problems more general to touchpad performance. For example, manufacturing tolerances of the sensing circuitry are not very forgiving in the state of the art. The result is that touchpads have required precision layout of sensor electrodes. Without precision layout, the sensing circuitry is not capable of compensating for variations in the layout. Thus, manufacturers have often had to use more costly PC boards to obtain the precise layout needed for reliable touchpad operation.

Accordingly, it would be an improvement over the prior art to improve the performance of the sensing circuitry such that the circuitry could tolerate and compensate for greater variations in the layout of the sensing electrodes. This can be accomplished by improving the dynamic range of the sensing circuitry.

Another problem inherent to touchpads is locating a valid object on the touchpad surface. The total number of measurements of the sensing circuitry that are required to locate the valid object has a significant affect on power consumption. Accordingly, it would an improvement over the prior art to have quicker scanning algorithms, thereby enabling the sensor circuitry to power down and thereby conserve power. It would also be an advantage over the prior art to be able to compensate for objects which are no longer considered to be valid objects on the touchpad surface.

Another reliability issue of touchpads lies in the sensing circuitry. The prior art generally scans for objects with a single algorithm. In other words, there are no adjustments made in scanning routines for objects that are moving rapidly or slowly.

It would be an improvement over the prior art to utilize an adaptive motion filter which can compensate for the speed at which an object on the touchpad surface is moving. The advantage of this type of filtering is that the touchpad is capable of more precise sensing when the object is moving slowly, and keep pace with an object that is moving faster by using reduced filtering. Effectively, the resolution is decreased in exchange for keeping pace with the object being tracked.

A last performance issue of prior art touchpads is concerned with the sampling of data from the sensing electrodes. Noise in the touchpad circuitry can prevent the sensing circuitry from performing correctly.

Therefore, it would be an advantage over the state of the art in touchpads to provide a filter which could compensate for noise and prevent false signals from affecting location calculations of the touchpad.

OBJECTS AND SUMMARY OF THE INVENTION

It is an object of the invention to provide a system and method for improved touchpad performance in the presence of moisture.

It is another object to provide a system and method for improved touchpad performance when there is at least one water droplet on a touchpad surface.

It is another object to provide a system and method for improved touchpad performance through increased electronic noise rejection.

It is another object to provide a system and method for improved touchpad performance through increased EMI and power supply noise rejection.

It is another object to provide a system and method for improved power conservation through an improved scanning routine used in the identification and tracking of objects on the touchpad surface.

It is another object to provide a system and method for improved identification of objects on a touchpad surface so that extraneous objects can be more readily ignored by touchpad circuitry.

It is another object to provide a system and method for improved touchpad performance regarding tracking of objects relative to speed and acceleration by being able to adjust tracking resolution relative to the speed of an object being tracked.

It is another object to provide a system and method for improved tolerance to manufacturing variations by providing sensing circuitry with an increased dynamic range.

It is another object to provide a system and method for improved position detection by using time aperture filtering to reduce the effects of noise.

The above objects are realized in a specific illustrative embodiment of a system and method including a touchpad and measurement circuitry for enabling input to a computer or other electronic device. The system includes an X electrode, a Y electrode, a common sensing electrode, and a "water" electrode, where these four separate electrodes can be implemented in various physical configurations to obtain the desired effects, wherein moisture and water droplets can be identified and compensated for so as not to interfere with the input of data, wherein noise rejection is achieved by using a time aperture filtering method, where an improved scanning technique focuses scanning around an identified input object, and where an adaptive motion filter responds to the speed and acceleration of an object being tracked, and wherein the measurement circuitry has an increased dynamic range enabling the touchpad to operate with greater tolerances to manufacturing variances.

In accordance with a first aspect of the invention, the touchpad disposes the water electrode as near to the surface of the touchpad as is practical. In a preferred embodiment, the X or Y electrode is combined with the water electrode just beneath the touchpad surface.

In accordance with a second aspect of the invention, the water electrode capacitively couples to water on the touchpad surface to thereby balance the added capacitance between the drive (X and Y) electrodes and the common sensing electrode.

In accordance with a third aspect of the invention, a scanning method is modified to more rapidly identify the presence of an input object such as a finger. The scanning pattern is then minimized around the location of the finger, eliminating the need to scan the entire touchpad surface until the finger is removed.

In accordance with a fourth aspect of the invention, a quicker scanning routine results in reduced power consumption because the sensing circuitry completes its locating and tracking task more efficiently.

In accordance with a fifth aspect of the invention, inherent imbalances within the touchpad sensors are reduced to thereby enable the touchpad to be able to tolerate larger manufacturing discrepancies thereof.

In accordance with a sixth aspect of the invention, a time aperture filter is used to more selectively obtain position information of an object on the touchpad surface, thereby reducing the deleterious affects of noise.

In accordance with a seventh aspect of the invention, the aperture filter selectively obtains position information using a changing frequency, thereby further eliminating unwanted noise which is otherwise synchronous with the sampling rate of the time aperture filter.

In accordance with an eighth aspect of the invention, an adaptive motion filter makes adjustments to a level of precision and a response rate relative to the speed and acceleration of a tracked object.

In accordance with a ninth aspect of the invention, improved identification of objects on a touchpad surface enables the system to ignore extraneous objects.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention makes significant improvements in the overall performance of a touchpad. However, while some of the improvements are specific to a capacitance sensitive touchpad, other improvements are more generalized. Nevertheless, the presently preferred embodiment of the invention is a capacitance sensitive touchpad having a plurality of electrodes disposed in a plurality of electrode planes or layers. The circuitry and operation thereof are presently integrated into the PEGASUS(™) chip of Cirque Corporation.

Figure 1:
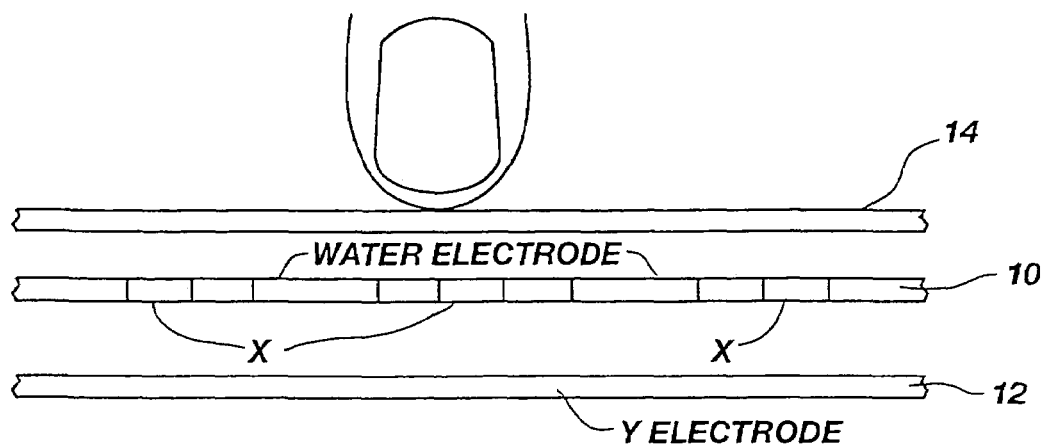
FIG. 1 is a perspective and expanded illustration of the touchpad surface and the electrode planes which is made in accordance with the presently preferred embodiment of the invention.

FIG. 1 shows that, in the presently preferred embodiment, two electrode planes 10, 12 are utilized. The figure is a profile view which exaggerates the thicknesses of the electrodes, and the distance between the electrode planes 10, 12 and the touchpad surface 14. It is also preferred that a "water" electrode be incorporated into the top electrode plane 10. This placement is preferred as a result of the function of the water electrode. In order to capacitively couple to water on the touchpad surface 14, the water electrode needs to be as close as possible to the touchpad surface 14 in order to minimize its size. The farther away from the touchpad surface 14 that the water electrode is positioned, the larger it must be.

Advantageously, it is possible to dispose another electrode in the electrode plane 10. Because it is also preferable to separate the drive electrodes from the common sensing electrode, the X or the Y electrode is disposed therein. This is accomplished by interleaving or interdigitating the water electrode and the X or Y electrode. For the purposes of the preferred embodiment, the X electrode is selected as sharing the top electrode plane 10. The X electrode and the water electrode are shown "on end" in this view. It is also observed that only a few electrodes are illustrated in this figure. The actual number of electrodes is greater in an actual touchpad. This figure is for illustration purposes only.

The Y electrode and the common sensing electrode are disposed on the bottom electrode plane 12. The Y electrode is interleaved with the common sensing electrode to reduce the total number of electrode planes that are used. This results in a cost savings, and reduced complexity in the design. The Y electrode and the common sensing electrode are shown on a side edge, thus exposing only one of them in FIG. 1.

Figure 2:
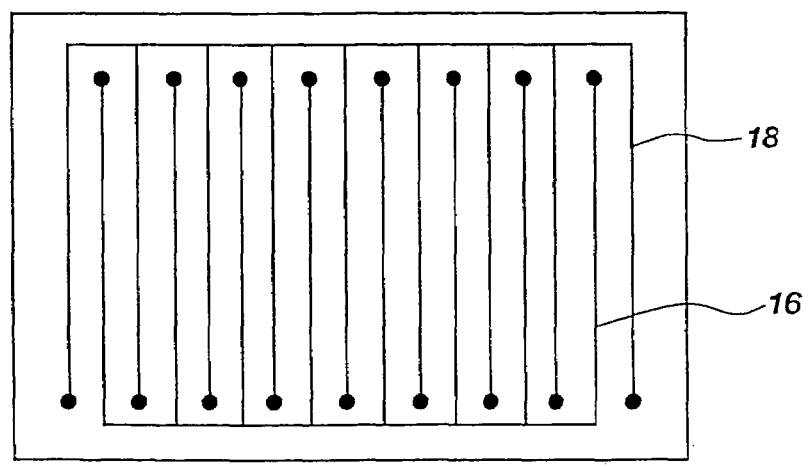
FIG. 2 is a top view of an electrode plane which shows a preferred configuration of interleaving for the preferred two electrodes which are present thereon.

FIG. 2 is a top view of an electrode plane. The figure is provided to illustrate one possible configuration of electrodes on a surface thereof. What is important to note is that there are a plurality of "fingers" which are interleaved to thereby maximize the extent of coverage by an electrode across the area of the touchpad. The figure illustrates a preferred configuration of interleaving which would occur on both of the electrode planes 10 and 12 of FIG. 1.

For example, the electrode 16 could be the X electrode of the top electrode plane 10, and the electrode 18 could be the water electrode. It is noted that the thickness, placement, and number of electrode fingers is not to be considered to be accurate. The figure is provided only to illustrate the concept of using interleaved electrodes to make maximum use of a single electrode plane by combining electrodes. Furthermore, it is also noted that the water electrode is most likely to have fingers that are wider than the X, Y or common sense electrodes. It has been determined that the water electrode is ideally given a maximum amount of surface area possible in order to couple to any liquid that is present on the touchpad surface.

It is observed that this illustration also serves to show the configuration of the Y electrode and the common sensing electrode. The Y electrode would be shown as 16, and the common sensing electrode as 18. Of course, the orientation of the Y and the common sensing electrode would be perpendicular to the orientation shown for the X electrode and the water electrode.

Another advantage of the present invention is the ability to cancel out any signal generated by water that is disposed on the touchpad surface. Using the touch sensing circuitry of the present invention, a drop of water increases measured capacitance, while a finger decreases measured capacitance. This fact is used to balance a positively driven side of a touchpad to a negatively driven side of the touchpad pad, thereby enabling software to cancel out the effect of the water.

For this reason the water electrode is said to "balance" out the added capacitance between the drive electrodes (X and Y), and the common sensing electrode. In other words, by adding an electrode which is dedicated to subtracting the influence of water, the drive and sensing electrodes are able to function as desired without interference by the water droplet.

It is noted that the water droplet which is being detected and canceled by using the "water" electrode out can be some other liquid. The purpose of detecting and canceling out the effect of a liquid on the touchpad surface is solely to increase reliability of a touchpad device under many different operating conditions. While it is more likely that water is going to be the liquid that is present on the touchpad surface, it is not the only liquid which the "water" electrode will detect.

Noise rejection in touchpad circuitry is a very important issue for portable devices. Portable devices which incorporate a touchpad can often be operated using an internal power supply or by plugging in to an external power source. Unfortunately, an external power source can generate a significant amount of noise which is not filtered from the touchpad or other system circuitry. For reliable operation, the touchpad needs to be able to reject noise which will otherwise generate false readings to the electrodes.

Advantageously, a time aperture filter is utilized to filter out noise. The basic principle of operation is to only take a measurement reading when it is known that data can be read. In other words, by ignoring all other signal input except during a short measurement window, extraneous signals will have a much smaller opportunity to affect touchpad performance.

Figure 3:
FIG. 3 is a graphical view showing a waveform of a drive signal which is applied to the X and Y electrodes as taught by the parent application.

FIG. 3 is provided to illustrate the concept above. Specifically, a waveform is shown having a frequency at which the electrodes X and Y generate a signal. It was observed that the most useful measurement information from the position sensing electrodes is obtained during a relatively short time period with respect to the total duration of the driven signal. The relatively short useful time period is indicated by time frame 20. In contrast, the entire time period from the beginning of one sensing signal being generated to the next is indicated by time frame 22. FIG. 3 is not shown to scale because time frame 20 is approximately 1/20th in size relative to time frame 22. More specifically, time frame 22 is approximately 10 µs, and time frame 20 is approximately 500 ns in the presently preferred embodiment.

Figure 4:
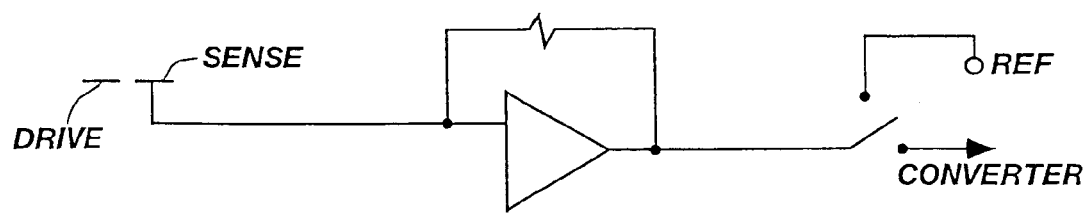
FIG. 4 is a circuit diagram which shows the preferred method of applying a time aperture filter to the measurement circuitry of the touchpad, to thereby prevent a substantial portion of noise that affects the circuitry from interfering with the measurements.
Figure 5:
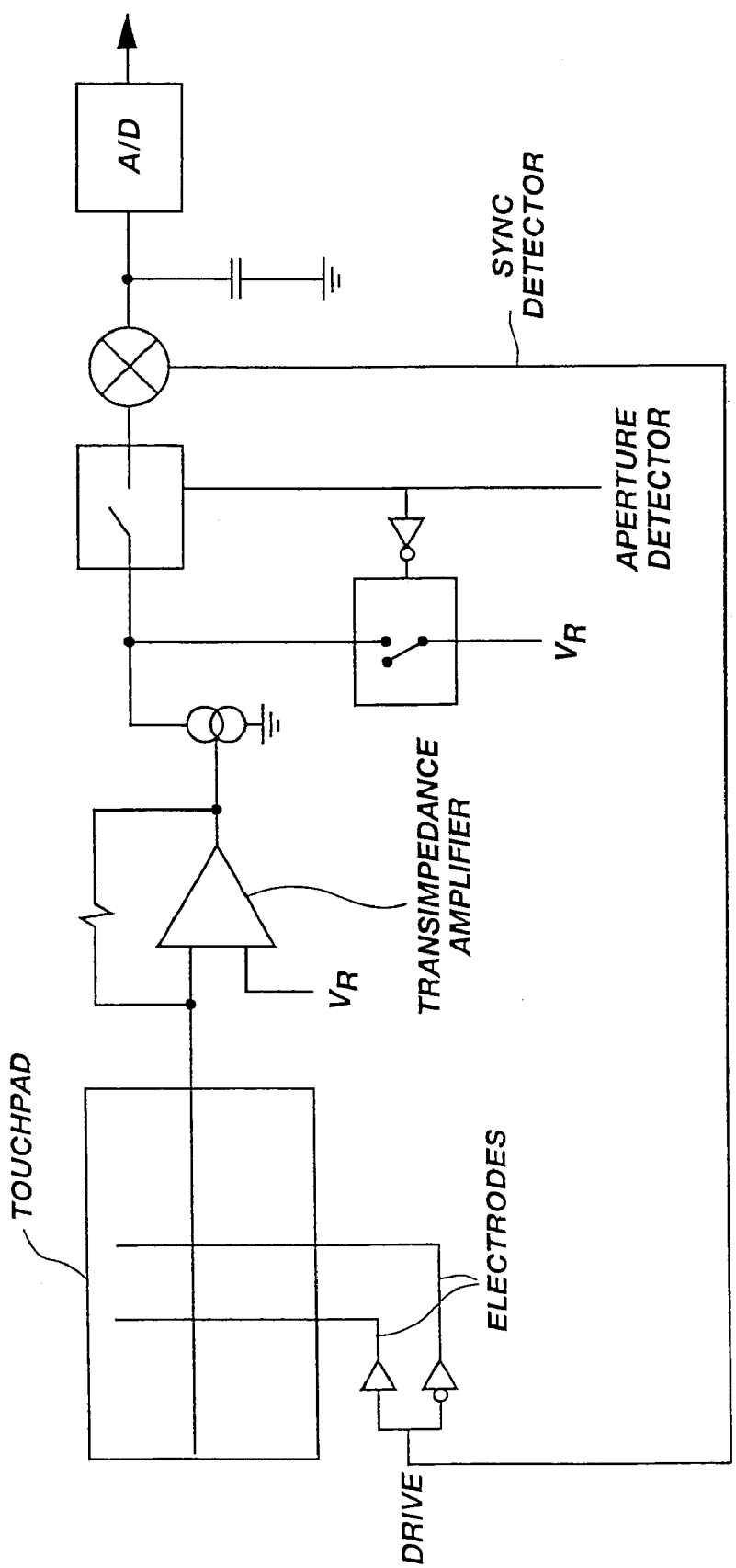
FIG. 5 is a block diagram which shows the relationship of the components within a capacitance sensitive touchpad which is made in accordance with the principles of the presently preferred embodiment.

FIG. 4 is provided as an illustration of a circuit 30 which can be utilized to accomplish the desired filtering. The aperture is placed at the back end of a transconductance amplifier, or in front of the converter. The aperture is opened just prior to an electrode transition, enabling the change from the transition to be transferred into the converter. When the aperture time is completed, the aperture is closed by transferring or draining any remaining charge to a reference. The result is that only the charge or signal that is related to an electrode event is passed to the converter, and all other signals that would be noise generated are stopped or filtered away from the converter. In other words, most of the measurement signal can be ignored, thereby minimizing the time frame in which noise is able to influence the measurement being taken from the common sensing electrode.

It is also realized that a noise signal that is synchronous with the preferred time aperture filter might still interfere with the sensing function. Accordingly, an alternative embodiment is to vary the frequency that is driving the electrodes, and thus the frequency of the aperture window in which measurements are taken. This would eliminate the possibility of allowing a time synchronous signal to regularly interfere with the measurement process.

It is noted that the sources of noise are many, but are often from power sources.

The presently preferred embodiment also includes an adaptive motion filter. The adaptive motion filter will adjust performance of the touchpad in accordance with the changing parameters of an object being tracked. These parameters include the aspects of speed and acceleration.

For example, consider a finger on a touchpad which is slowly moving over the surface. The present invention first determines the presence of the finger, and then determines an instantaneous speed of the finger. A speed threshold value is set within software of the touchpad. The software provides a trade off in performance of the touchpad. If the finger is determined to be moving slowly because its speed is below the speed threshold value, then it is more advantageous if the touchpad provides greater precision in tracking the position of the finger as opposed to providing more rapid updates of the finger position. This is because slow movement is generally the result of a finger more precisely controlling movement of a cursor on a computer display. At the very least, the need for providing precise movement control was recognized, and thus incorporated into the present invention. The relatively slower position updates of the finger location are also inherently not a problem for the simple fact that the finger is moving slowly.

In contrast, the software provides the opposite trade off in performance of the touchpad if the finger is determined to be moving rapidly because its speed is above the speed threshold value. It is more advantageous, for example, if the touchpad provides quicker response in updating its location on the touchpad, and therefore the corresponding location of a cursor on a computer display. The finger is probably moving the cursor to a new location or even dragging an object across a desktop. Precision in this case is not as important as making sure that the cursor is accurately displaying the last known and relatively less precise position of the finger on the touchpad. Furthermore, the relatively lower precision of the finger location is inherently not a problem for the simple fact that the finger is moving so quickly.

It is observed that the acceleration and deceleration of the finger on the touchpad surface is handled by using the same speed threshold value. The measurements taken of the finger to determine the relatively instantaneous speed of the finger are more than adequate to make compensations on the fly as the finger accelerates to a relatively constant speed, and then decelerates to a stop.

It is also observed that there can be more than one speed threshold value. For example, there can be a lower speed threshold, midrange speed, and upper speed threshold. Accordingly, the factors of precision and response could be modified at the for these three different areas, or for an even greater number of divisions of speed. However, for simplicity, the preferred embodiment operates under a scheme which defines two possible levels of precision and response time.

Another feature of the presently preferred embodiment is the improvement of a scanning routine. The scanning routine refers to the function of detecting, identifying and tracking an object that touches the touchpad surface. The present invention provides a scanning function which is more efficient and uses less power than scanning functions of the prior art.

When there are no objects being tracked on the touchpad surface, the scanning function of the presently preferred embodiment is in a wide scan mode. In other words, all of the electrodes that can be driven are activated so that the presence of a new object can be detected at any location on the touchpad. For example, consider a finger which touches the surface of the touchpad. The scanning function detects the presence because of the decrease in capacitance between electrodes and the common sense electrode at the location of the finger. This ability is present in the state of the art scanning functions.

However, one new feature of the scanning function is the ability to then focus the scanning function. In other words, instead of keeping all of the electrodes powered up, only the electrodes in the immediate vicinity of the detected object are kept active. This means that another object, such as a finger, could also be placed on the touchpad surface. As long as the first object remains in contact with the touchpad surface, the new object will be ignored. Should the first object then be removed from the touchpad surface, the scanning routine immediately widens its search pattern by again activating all of the electrodes. The second object will be detected, and then the scanning routine will again focus, deactivating the majority of the electrodes of the touchpad.

Suppose, however, that the first object to be placed on the touchpad surface is not a finger or stylus, but a drop of water. The touchpad determines that the first object is a liquid because it increases the capacitance between the drive electrodes and the common sense electrode, instead of decreasing it which occurs with objects that are used as input devices (a finger, stylus, etc.). The water electrode is used to eliminate the effect of the water droplet. Advantageously, from that point on, the water droplet and its effect on the touchpad circuitry is ignored.

The situation might also arise where the water droplet moves. In this scenario, its effect on the touchpad must again be compensated for, and its influence canceled out again. Therefore, as long as the water droplet is stationary, its effect on the touchpad is able to be ignored. Movement of the water droplet requires recompensation.

It should also be apparent that the addition of a second, or third, or other number of water droplets will require the scanning routine to again compensate for their effects on the touchpad circuitry. Each water droplet is identified and its effect canceled out. The scanning routine will therefore not focus on water droplets. If the touchpad surface is therefore covered by several water droplets, the scanning routine will ignore them after identifying and then canceling them out. The touchpad surface thus remains in a wide scan mode where all the scanning electrodes are activated so as to be looking for an object that will provide input.

Another improvement which is taught in the presently preferred embodiment is an increased dynamic range of the touchpad circuitry. The presently preferred embodiment for the touchpad is based on capacitance sensing. A problem with the X and Y driving electrodes of such a touchpad is that manufacturing tolerances for the different "fingers" of the X and Y electrodes could result in current imbalances when the widths of the fingers are different. While small, these current imbalances typically resulted in the smallest measurement bits being discarded because they could not be considered reliable.

The present invention has resulted in a significant improvement in the reliability of the lowest bits of measurement circuitry in the touchpad. The improvement comes from two factors. First, an improved analog-to-digital converter is included in the measurement circuitry. Specifically, a noise level within the A/D converter is significantly decreased.

The second factor is an unexpected result which came about as a consequence of the new A/D converter. Specifically, the number of samplings taken by the measurement circuitry was doubled to thereby cause a decrease in the noise of the A/D converter.

Together, the decreased noise of the A/D converter and the two-fold increase in the number of samples of the measurement circuitry have combined to create at least a four-fold increase in accuracy of the touchpad sensing circuitry.

Advantageously, it is possible to use the improved manufacturing tolerances in some unexpected ways. For example, given that the measurement circuitry can tolerate more noise and imprecision of associated circuitry, it was determined through experimentation that it is possible to lay out sensing electrodes using relatively imprecise means. For example, the sensing electrodes can be laid out using a simple silk screening process. Such a manufacturing technique has great implications in the touchpad industry because of the never ending desire to product an inexpensive touchpad, but with improved performance and features.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for providing adaptable precision of a capacitance sensitive touchpad, said method comprising the steps of:
   (1) determining a speed of an object moving on a touchpad surface;
   (2) determining if the speed of the object is above or below a speed threshold;
   (3) increasing precision of the touchpad when the speed of the object is determined to be below the speed threshold; and
   (4) decreasing precision of the touchpad when the speed of the object is determined to be above the speed threshold.

2. The method as defined in claim 1 wherein the method further comprises the step of determining if the speed of the object is above or below the speed threshold by obtaining an instantaneous speed of the object.

3. The method as defined in claim 2 wherein the step of increasing or decreasing precision of the touchpad further comprises the step of using an adaptive motion filter to modify performance of the touchpad.

4. The method as defined in claim 3 wherein the step of using an adaptive motion filter to increase precision further comprises the step of increasing a rate of determining a position of the object on the touchpad surface.

5. The method as defined in claim 4 wherein the method further comprises the step of decreasing position updates transmitted to a display device.

6. The method as defined in claim 3 wherein the step of using an adaptive motion filter to decrease precision further comprises the step of decreasing a rate of determining a position of the object on the touchpad surface.

7. The method as defined in claim 6 wherein the step of decreasing precision further comprises the step of providing more rapid updates of the object position to a display device, wherein the display device receives position information regarding the object at an increased rate.

8. The method as defined in claim 1 wherein the steps of increasing and decreasing precision of the touchpad further comprises the step of providing a plurality of different levels of precision for the touchpad, wherein the plurality of different levels of precision correspond to a plurality of different speeds of the object on the touchpad surface.

9. A method for providing adaptable precision of a capacitance sensitive touchpad, said method comprising the steps of:
   (1) determining a rate of acceleration or deceleration of an object moving on a touchpad surface;
   (2) determining if the rate of acceleration or deceleration is above or below an acceleration or deceleration threshold;
   (3) increasing precision of the touchpad when the rate of acceleration or deceleration is determined to be below the acceleration or deceleration threshold; and
   (4) decreasing precision of the touchpad when the speed of the object is determined to be above the acceleration or deceleration threshold.

10. The method as defined in claim 9 wherein the method further comprises the step of determining if the rate of acceleration or deceleration of the object is above or below the acceleration or deceleration threshold by obtaining at least two instantaneous speeds measurements of the object.

11. The method as defined in claim 10 wherein the step of increasing or decreasing precision of the touchpad further comprises the step of using an adaptive motion filter to modify performance of the touchpad.

12. The method as defined in claim 11 wherein the step of using an adaptive motion filter to increase precision further comprises the step of increasing a rate of determining a position of the object on the touchpad surface.

13. The method as defined in claim 12 wherein the method further comprises the step of decreasing position updates transmitted to a display device.

14. The method as defined in claim 13 wherein the step of using an adaptive motion filter to decrease precision further comprises the step of decreasing a rate of determining a position of the object on the touchpad surface.

15. The method as defined in claim 14 wherein the step of decreasing precision further comprises the step of providing more rapid updates of the object position to a display device, wherein the display device receives position information regarding the object at an increased rate.

16. The method as defined in claim 9 wherein the steps of increasing and decreasing precision of the touchpad further comprises the step of providing a plurality of different levels of precision for the touchpad, wherein the plurality of different levels of precision correspond to a plurality of different rates of acceleration or deceleration of the object on the touchpad surface.

17. A method for providing adaptable precision of a capacitance sensitive touchpad, said method comprising the steps of:
   (1) monitoring at least one aspect of an object moving on a touchpad surface;
   (2) determining if the at least one aspect of the object has reached a state wherein the precision of the capacitance sensitive touchpad should be modified;
   (3) increasing precision of the touchpad when the at least one aspect of the object is determined to be within a first state; and
   (4) decreasing precision of the touchpad when the at least one aspect of the object is determined to be within a second state.

18. The method as defined in claim 17 wherein the method further comprises the step of selecting the at least one aspect of the object moving on the touchpad surface from the group o aspects comprising speed and acceleration.

19. A method for balancing accuracy of object position determination on a touchpad and rate of updates to a display device of the object position, said method comprising the steps of:

(1) determining if accuracy of object position is more critical to touchpad performance than rate of updates to a display device;

(2) optimizing touchpad performance to provide more accurate position determination information when that aspect of touchpad performance is more important than rate of display; and (3) optimizing touchpad performance to provide an increased rate of updates of position information to a display device when that aspect of touchpad performance is more important that accuracy of position information.

20. The method as defined in claim 19 wherein the method further comprises the step of using speed or acceleration of an object moving across the touchpad surface as the criteria for determining which aspect of touchpad performance will be optimized.

* * * * *